July 5, 1927.

L. E. McCREEDY 1,635,134

TIRE FINISHING MACHINE

Filed May 20, 1925

INVENTOR.
LloydE.McCreedy.
BY
ATTORNEY.

July 5, 1927.

L. E. McCREEDY 1,635,134

TIRE FINISHING MACHINE

Filed May 20, 1925

INVENTOR.
Lloyd E. McCreedy.
BY
ATTORNEY.

Patented July 5, 1927.

1,635,134

UNITED STATES PATENT OFFICE.

LLOYD E. McCREEDY, OF RACINE, WISCONSIN, ASSIGNOR TO THE RACINE HORSESHOE TIRE COMPANY, OF RACINE, WISCONSIN, A CORPORATION OF WISCONSIN.

TIRE-FINISHING MACHINE.

Application filed May 20, 1925. Serial No. 31,547.

This invention relates to tire finishing machines, and particularly to machines for finishing clincher tires after they have been removed from the cores on which they have been built.

In the art of manufacturing tires, the procedure now being followed in modern tire factories is to build the tires on cores in the usual manner, i. e. apply the fabric plies and beads to the core to complete the carcass of the tire and also to apply the tread to the carcass while on the core, and then to remove the carcass from the core and perform the finishing operations on the carcass, these operations including the application of the rubber side-walls and the bead chafer strips, which latter are strips of rubberized fabric stitched about the outer surface of the beads, over the "toes" of the beads and against the inside of the tire.

The chief object of the present invention is to provide an improved machine for rapidly and effectively performing the finishing operations on a tire unsupported by a core.

Another object of the invention is to provide means for supporting and circumferentially driving a tire and stitching means normally urged against a tire by yielding means such as a spring to stitch the tire against the supporting and driving means.

Another object of the invention is to provide means for manually urging a stitching means against the tire to impart stitching pressure thereto in addition to that which is imparted by the above yielding means.

Another object of the invention is to provide means adapted to act progressively on the tire to first apply the bead chafer strip and to subsequently apply the side-wall so as to overlap said chafer strip adjacent the bead.

Another object is to provide means for independently disengaging certain stitches from the tire to facilitate splicing and other operations on the tire while it is not being rotated.

Another object is to provide an improved friction drive device adapted to be readily controlled by the operator to rotate or discontinue rotation of the tire at any desired instant.

Another object is to provide a series of stitchers each independently adjustable to positions such that they will properly engage and act upon the tires.

Another object is to provide cooperating tire finishing instrumentalities so arranged on a standard that the tire may be easily and quickly arranged thereon without passing the tire over the standard.

Another object is to provide means on the above standard for engaging the tire so as to support it in proper relation to be circumferentially driven relative to the various stitchers.

Another object is to provide means riding on the tire adjacent the stitchers, to urge the tire into proper relation against the stitchers.

The foregoing and ancillary objects are obtained by the construction illustrated in the accompanying drawings and described in detail below. It is to be understood that the invention is not limited to the specific construction shown and described.

Of the accompanying drawings—

Figure 9 is a detail elevation of a manually operable means for operation of certain stitchers onto or off of the tire;

Figure 10 is a plan thereof;

Figure 11 is a radial section through a completed casing prior to vulcanization;

Figure 12 is a section through the side-wall strip; and

Figure 13 is a section through the chafer strip.

Figure 1:
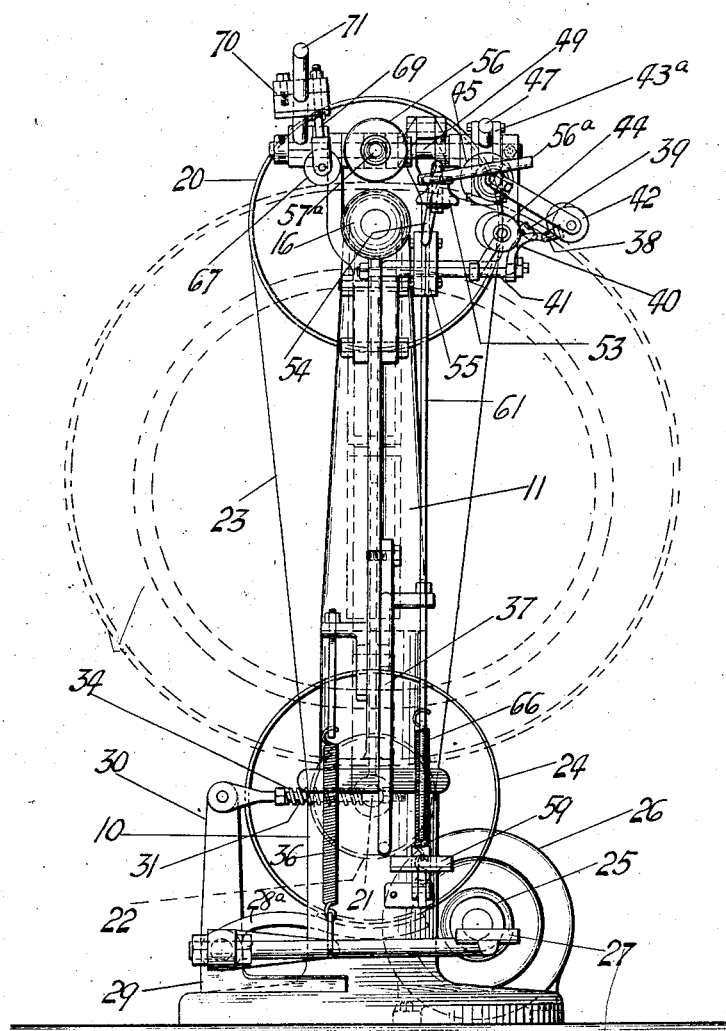
Figure 1 is a front elevation of a machine embodying the invention.
Figure 2:
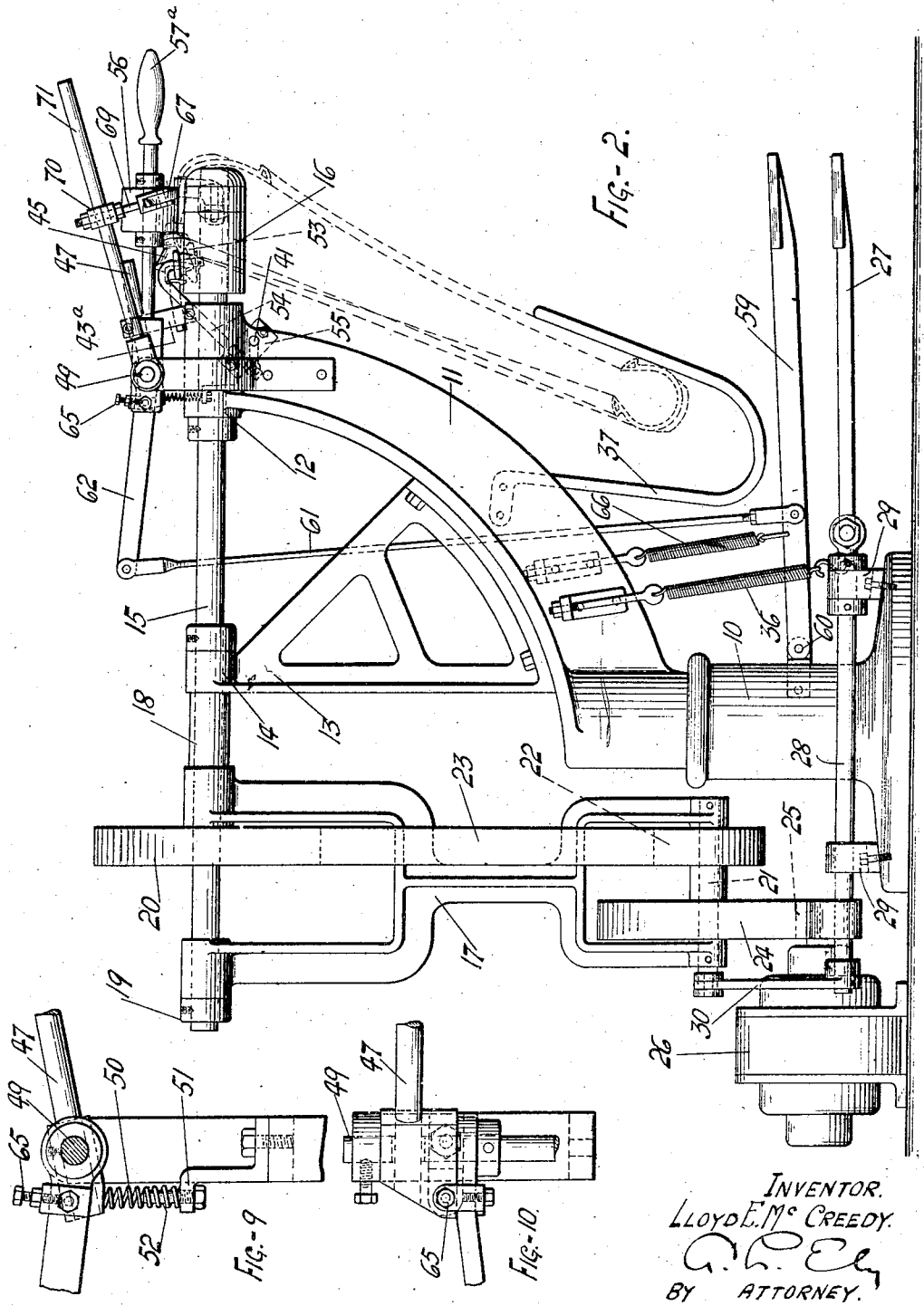
Figure 2 is a left side elevation thereof.
Figure 3:
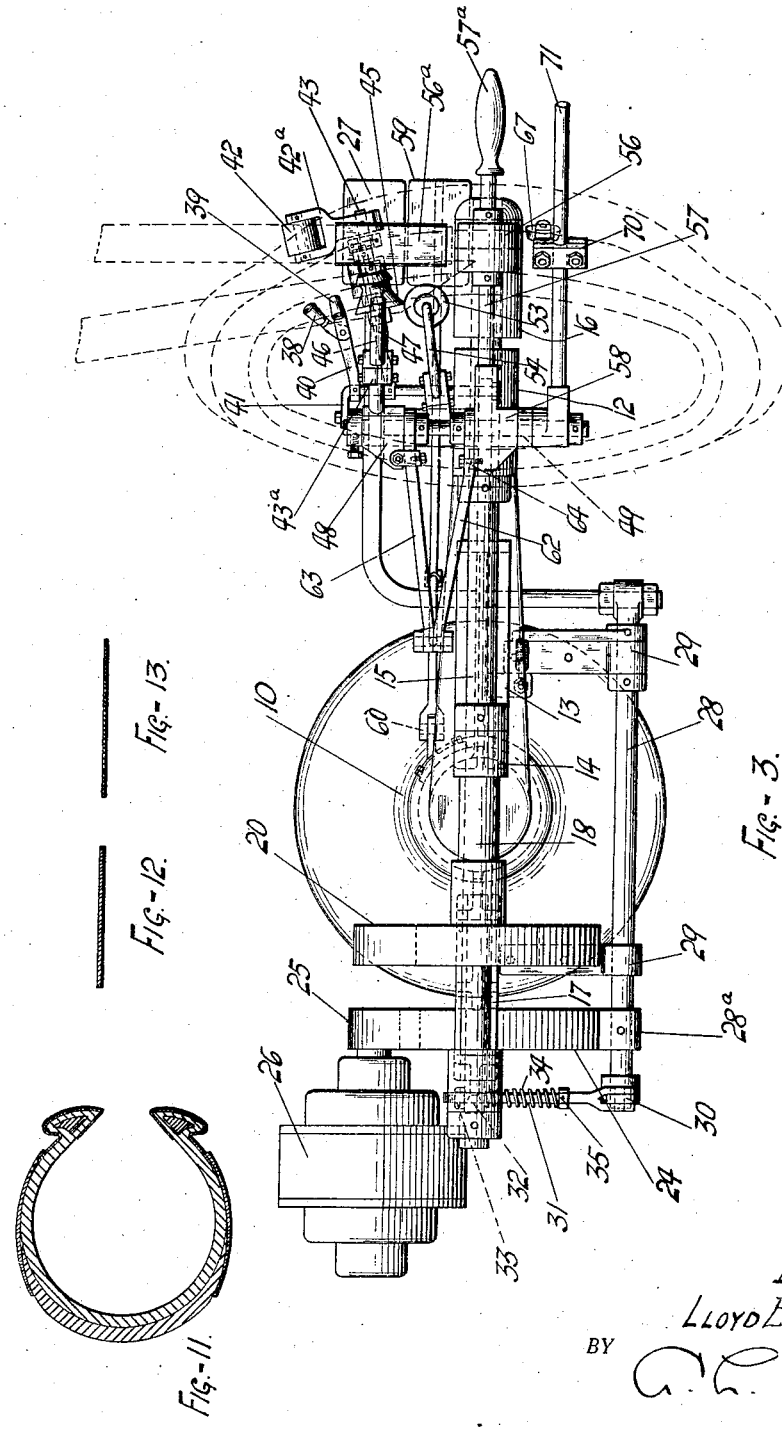
Figure 3 is a plan thereof.

Referring to the drawings, 10 is a suitable standard supporting an overhanging curved bracket 11 having a bearing 12 formed in its upper end. Bracket 11 has mounted thereon a second bracket 13 formed with a bearing 14 in its upper end and aligned horizontally with bearing 12. In bearings 12 and 14 is journaled a drive shaft 15 carrying on its end projecting to the right of bearing 12 (Figure 2) a tire supporting and driving roller 16. On its end, projecting to the left of bearing 14, is suspended a bracket arm 17 spaced on shaft 15 from bearing 14 by a sleeve 18 and retained on said shaft by a collar 19. Secured on shaft 15 is a pulley 20 and journaled on a spindle 21, carried on the lower end of bracket arm 17, is a pulley 22. A belt 23 is trained over pulleys 20 and 22. Journaled on spindle 21 and rotatively connected with pulley 22 is a friction pulley 24 adapted to engage a friction pulley 25 driven by a motor 26. A pedal 27 is arranged to move arm 17 to carry pulley 24 into engagement with pulley 25. This pedal is connected to a rock shaft 28 journaled in brackets 29, 29 mounted on standard 10. Rock shaft 28 has an arm 30 thereon connected yieldably to bracket arm 17 by a link 31 slidable through an aperture 32 in arm 17 and having an adjustable stop 33 on its free end and a coil compression spring 34 thereon between arm 17 and an adjustable collar 35. Secured on rock shaft 28 is a brake 28ª adapted to be normally engaged with pulley 24 but to be disengaged therefrom when pedal 27 is depressed. When pedal 27 is depressed, spring 34 is adapted yieldingly to urge pulley 24 against pulley 25. A spring 36 normally holds pedal 27 elevated.

Roller 16 is adapted to receive a tire thereon in the manner shown in dotted lines in Figures 1 to 4. In order to support the lower side of the tire while in the machine so that the inner side-wall may be flattened out properly on roll 16 for the driving and stitching operations, a U-shaped arm 37 is secured on bracket 11, the arm being formed of a round rod bent to the shape shown and adapted to engage the outer side of the tire to hold the lower side thereof inwardly at a substantial angle to the perpendicular.

There is also arranged to engage the tire to present it properly to the stitchers, a pair of angularly directed bead engaging rollers 38 and 39 journaled on an arm 40 adjustable along and angularly adjustable on a rod 41 mounted on bracket 11 and extending substantially parallel to the stitchers. The rollers 38 and 39 are arranged so that the toe of a tire bead will engage therebetween.

Riding on the tire at a point where it commences to flatten out under the action of the stitchers is a roller 42 journaled on an arm 42ª secured on a spindle 43 and being angularly and longitudinally adjustable thereon. Spindle 43 is in turn secured on a block 43ª later to be described.

Figure 5:
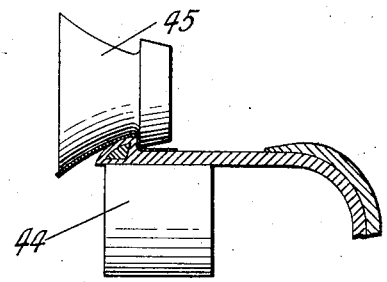
Figure 5 is a diagrammatic illustration of the first stitching operation performed by the machine.

The first stitching operation is that of pressing the chafer onto the side-wall and over the bead of the tire (Figure 5). This is accomplished by means of a supporting roller 44 over which the tire travels and a stitcher roller 45 formed of the profile shown so as to stitch the chafer snugly about the heel of the bead. Roller 44 is journaled on a spindle 46 and is longitudinally adjustable thereon. Spindle 46 is angularly and longitudinally adjustable on rod 41. Roller 45 is journaled on spindle 43.

Spindle 43 carried by block 43ª is arranged to be normally urged toward the tire. For this purpose block 43ª is adjustably mounted on a handle lever 47 which is secured in a block 48 journaled on a spindle 49 secured on the upper end of bracket 11. As best shown in Figures 9 and 10, block 48 is engaged by a compression spring 50 normally urging handle lever 47 downwardly. Compression spring 50 is mounted on a bracket 51 about a stud 52, bracket 51 being secured onto bracket 11. Accordingly rollers 42 and 45 may be elevated against the action of spring 52 by elevating handle 47.

Figure 6:
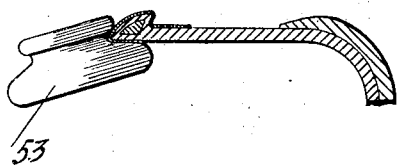
Figure 6 is a diagrammatic illustration of the second stitching operation performed by the machine.

The second stitching operation illustrated in Figure 6 consists in turning the chafer about the toe of the bead. For this purpose a roller 53 is employed. Roller 53 is formed of the shape shown to fit about the toe of the bead and is journaled on a spindle 54 secured in a block 55 in which spindle 54 is longitudinally adjustable. Block 55 is in turn angularly and longitudinally adjustable on rod 41.

Figure 7:
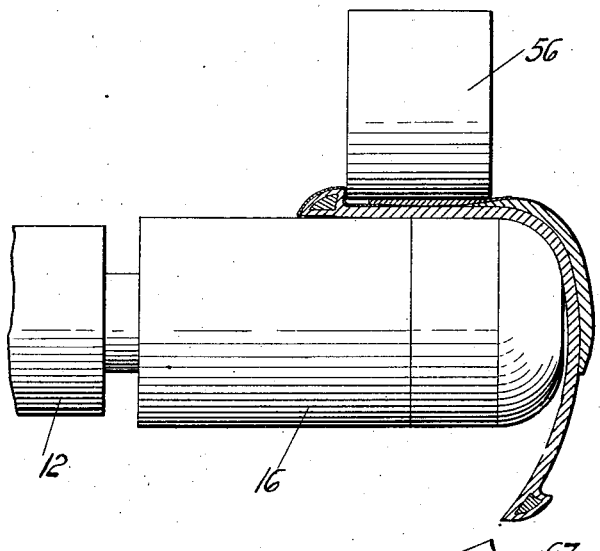
Figure 7 is a diagrammatic illustration of the third stitching operation performed by the machine.

The third stitching operation shown in Figure 7 is effected by means of side-wall pressing roller 56. Roller 56 is journaled on a spindle 57 secured in a block 58 and having a handle 57ª on its outer end. Block 58 is journaled on spindle 49. Rollers 42, 45 and 56 may be simultaneously elevated from rollers 44, 53 and 16 to facilitate mounting or dismounting tires in or from the apparatus by means of a foot pedal 59. Pedal 59 is pivoted at 60 on standard 10 and has a link 61 connecting it to a pair of arms 62 and 63, the former being connected to block 58 at 64 and the latter having an adjustable stud 65 thereon (Figures 9 and 10) adapted to engage block 48 to elevate handle lever 47. A spring 66 normally holds pedal 59 elevated and urges roller 56 toward roller 16 while permitting spring 50 to urge rollers 42 and 45 downwardly. For feeding side-wall stock onto the tire in proper position, a guide trough 56ª is mounted on spindle 43 so as to be both angularly and longitudinally adjustable thereon.

Figure 8:
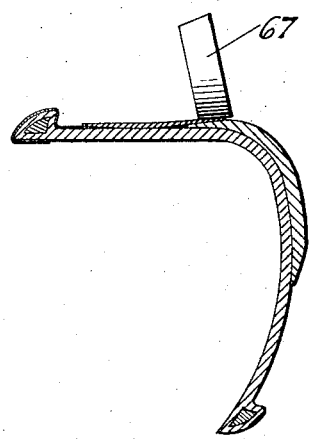
Figure 8 is a diagrammatic illustration of the fourth stitching operation performed by the machine.

The last stitching operation is performed by an edging roller 67 (Figure 8). This roller is journaled on an arm 69 secured to a block 70 angularly and longitudinally adjustable along a hand lever 71 pivoted on spindle 49.

The operation of the device will be understood from the foregoing description of its construction. Briefly it consists in first depressing pedal 59 and throwing back lever 71. A tire is then inserted in U-bracket 37 and passed over rollers 16 and 44 in the manner shown in Figure 2, the inner bead being forced into engagement with rollers 38 and 39. Pedal 59 is now released, thus permitting springs 66 and 50 to urge rollers 42, 45 and 56 down onto the tire pressing it against rollers 44 and 16. Lever 71 is then swung downwardly carrying edging roller 67 into engagement with the tire.

Figure 4:
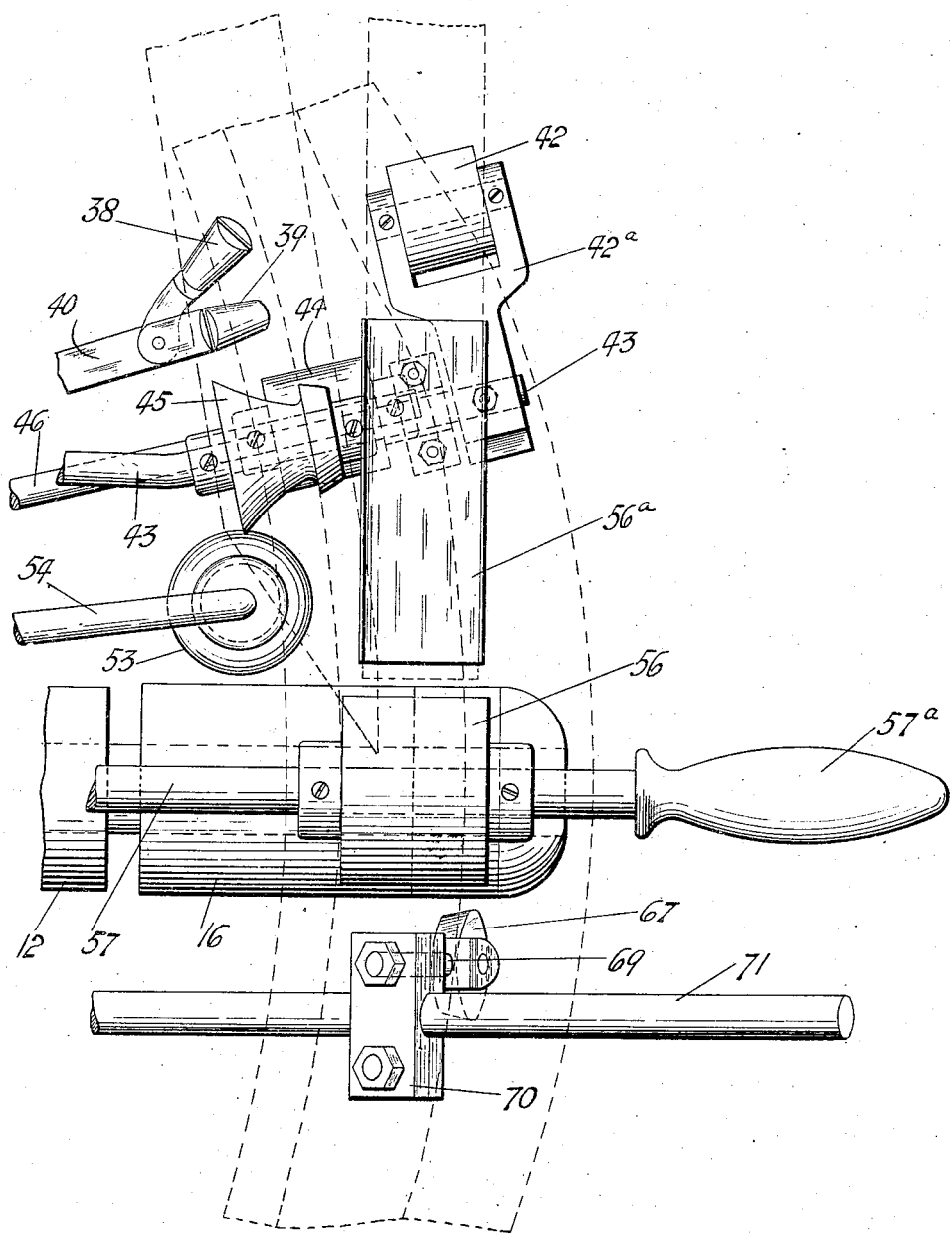
Figure 4 is a detail plan of the stitching instrumentalities.

A strip of chafer stock (Figure 13) is now passed onto the tire into proper position under roller 45, this roller being elevated to accomplish this result by operating lever 47. Pedal 27 is then depressed for an instant to drive the tire sufficient distance to advance the chafer to adjacent rollers 16 and 56. The chafer is cut off angularly at its end (Figure 4) so that when the tire is subsequently driven it will be presented progressively to the chafer turning roller 53. The side-wall strip (Figure 12) is passed through trough 56ª onto the tire in overlapping relation to the chafer strip (Figure 4). Pedal 27 is now depressed, thus driving the tire, and spindles 57 and 71 are pressed by hand to progressively stitch the chafer and side-wall in place completely around the tire, the strips being cut to length and stitched into place at the cut ends as will be understood. Spindle 71 is then thrown backwardly and pedal 59 is depressed to elevate the upper stitcher rollers, whereupon the tire is removed and turned and replaced in the machine to apply a chafer and side-wall to its other side.

Modifications of the invention may be resorted to without departing from the spirit thereof or the scope of the appended claims.

What I claim is:

1. Apparatus of the class described, said apparatus comprising means for supporting and circumferentially driving a tire casing by engagement with the inner surface of its side wall at one point, means yieldingly urged against said tire casing while it is being driven for applying a finishing element to said casing, means for lifting said applying means off of said casing, said means including a foot pedal, yielding means for operating the foot pedal to maintain the applying means on the casing, and an additional means for lifting the applying means off the casing independently of said pedal and said yielding means.

2. Apparatus of the class described, said apparatus comprising means for supporting and circumferentially driving a tire casing by engagement with the inner surface thereof at one point, a plurality of means normally urged against said tire casing while it is being driven for applying finishing elements to said casing, a single means for simultaneously lifting the plurality of means off of said casing, and yielding means between two of said plurality of means whereby one of said applying means can be lifted off of said casing independently of the other.

3. Apparatus of the class described, said apparatus comprising means for supporting and circumferentially driving a tire casing by engagement with the inner surface thereof at one point, a plurality of means for applying finishing elements onto said casing, said means being movable as a unit, and means normally yieldingly urging said applying means against said casing, one of said applying means being movable away from the casing against the action of a yielding means independently of another.

4. Apparatus of the class described, said apparatus comprising means for supporting and circumferentially driving a tire casing by engagement with the inner surface of its side wall at one point, a plurality of means for applying finishing elements onto said casing, said means being movable as a unit, and means normally yieldingly urging said applying means against said casing, each of said applying means being adapted to be manually urged against said casing with additional pressure independent of the other applying means.

5. Apparatus of the class described, said apparatus comprising means for supporting and circumferentially driving a tire casing by engagement with the inner surface thereof at one point, a plurality of means for applying finishing elements onto said casing, said means being movable as a unit, and means normally yieldingly urging said applying means against said casing, one of said applying means being movable away from the casing against the action of a yielding means independently of another, and each of said applying means being adapted to be manually urged against said casing with additional pressure independent of the other applying means.

6. In a tire finishing machine, means for supporting and driving a casing unsupported by a core by engagement with the inner surface thereof at one point, a plurality of pressure stitchers adapted to apply finishing elements to said casing by progressive action thereon, yielding means normally urging the stitchers onto the casing, and means for independently urging each of said stitchers against said casing with pressure in addition to that afforded by the yielding means.

7. In a tire finishing machine, an overhanging bracket, a tire supporting and driving roller journaled thereon and adapted to receive a tire thereon so as to engage the inner surface thereof at one point, and means extending from the bracket for supporting the tire to be driven circumferentially at an angle to the vertical.

8. In a tire finishing machine, an overhanging bracket, a tire supporting and driving roller journaled thereon, and adapted to receive a tire thereon, a pressure roller cooperating with said driving roller to flatten a side-wall of said tire whereby it assumes a position, and is driven, in a plane at an angle to the perpendicular and clear of said bracket.

9. In a tire finishing machine, an overhanging bracket, a tire supporting and driving roller journaled thereon, and adapted to receive a tire thereon, a pressure roller cooperating with said driving roller to flatten a side-wall of said tire whereby it assumes a position, and is driven, in a plane at an angle to the perpendicular and clear of said bracket, and means supporting the lower side of the tire to maintain it substantially in said plane while being driven.

10. Apparatus for finishing tire casings unsupported by cores, said apparatus including means for circumferentially driving the casing, a pair of cooperating rollers for applying a chafer over a bead of the tire, a roller for turning the chafer under the edge of the bead, cooperating rollers for applying a side-wall to the tire, and a roller for stitching the edge of the side-wall, said rollers being adapted to progressively act upon the casing in the order named.

11. Apparatus for finishing tire casings unsupported by cores, said apparatus including means for circumferentially driving the casing, a pair of cooperating rollers for applying a chafer over a bead of the tire, a roller for turning the chafer under the edge of the bead and cooperating rollers for applying a side-wall to the tire, said rollers being adapted to progressively act on the tire in the order named.

12. Apparatus of the class described, said apparatus comprising means for driving a tire circumferentially, a stitcher for applying a finishing element on the tire, means for moving the stitcher onto or off of the tire, a second stitcher for applying a finishing element to a tire, and means carried by the moving means for guiding a finishing element to said second stitcher.

13. Apparatus of the class described, said apparatus comprising a tire driving roller, devices operable upon a tire on said roller, a shaft on which said roller is secured, a bracket suspended on the shaft, said bracket carrying means for driving the shaft, a prime mover, and means for operating said said bracket to engage said driving means with said prime mover.

14. Apparatus of the class described, said apparatus comprising a tire driving roller, devices operable upon a tire on said roller, a shaft on which said roller is secured, a bracket suspended on the shaft, said bracket carrying means for driving the shaft, a prime mover, and means for operating said bracket to engage said driving means with said prime mover, said means including a foot pedal and yielding means normally holding the driving means disengaged from the prime mover.

15. Apparatus of the class described, comprising means for supporting and driving a tire by engagement with the inner surface thereof at one point, a stitcher for operating on the tire, and a mounting for the stitcher whereby it may be angularly and longitudinally adjusted thereon into proper engagement with said tire.

16. Apparatus of the class described, comprising means for supporting and circumferentially driving a tire by engagement with the inner surface thereof at one point, a series of stitchers adapted progressively to act upon said tire, means for moving a stitcher onto said tire, and means carried by the last-named means for engaging the tire and maintaining it in proper relation to the series of stitchers during a stitching operation.

LLOYD E. McCREEDY.